United States Patent Office 3,472,853
Patented Oct. 14, 1969

3,472,853
1-[(PYRIDO[2,1-c]-s-TRIAZOLYL)-LOWER-ALKYL]-
4-SUBSTITUTED-PIPERAZINES
Sydney Archer, Bethlehem, N.Y., assignor to Sterling Drug Inc., New York, N.Y., a corporation of Delaware
No Drawing. Continuation-in-part of application Ser. No. 481,075, Aug. 19, 1965, which is a continuation-in-part of application Ser. No. 254,475, Jan. 28, 1963. This application May 29, 1967, Ser. No. 642,170
Int. Cl. C07d 57/00; A61k 27/00
U.S. Cl. 260—268                                3 Claims

ABSTRACT OF THE DISCLOSURE

New 1 - [(pyrido[2,1-c]-s-triazoyl)-lower-alkyl]-4-substituted-piperazines indicated to be useful as tranquilizers, sedatives, skeletal muscle relaxants, adrenolytics, hypothermic agents, anti-convulsants, hypotensives, and cardiovascular agents.

---

This application is a continuation-in-part of my copending application Ser. No. 481,075, filed Aug 19, 1965, now U.S. Patent 3,362,956 (patented Jan. 9, 1968), which in turn is a continuation-in-part of my prior application Ser. No. 254,475, filed Jan. 28, 1963, and now abandoned.

This invention relates to certain 1-[(pyrido[2,1-c]- s-triazolyl) - lower - alkyl]-4-substituted-piperazines, their acid-addition and quaternary ammonium salts, and to intermediates and processes therefor.

The compounds of the invention are represented by the general formula:

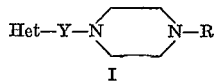

I wherein R is hydrogen or a lower-alkyl, hydroxy-lower-alkyl, phenyl, phenyl-lower-alkyl, benzhydryl, phenyl-lower- alkenyl, cycloalkyl-lower-alkyl, or pyridyl radical; Y is lower-alkylene of from one to six carbon atoms; and Het is a pyrido[2,1-c]-s-triazolyl radical.

In the above general formula I, when R represents a lower-alkyl radical, it can be straight or branched and can contain from one to about six carbon atoms and thus stands, inter alia, for methyl, ethyl, isobutyl, n-hexyl, and the like.

When R represents an hydroxy-lower-alkyl radical, it can be straight or branched, can contain from two to six carbon atoms and is such that the oxygen atom of the hydroxy-lower-alkyl group and the nitrogen atom of the piperazine ring are separated by at least two carbon atoms. R thus also stands, inter alia, for 2-hydroxyethyl, 3-hydroxy-1-methyl-propyl, 6-hydroxyhexyl and the like.

When R represents cycloalkyl-lower-alkyl, the cycloalkyl moiety contains from three to seven ring carbon atoms, while the lower-alkyl moiety contains from one to four carbon atoms. R thus also stands for cyclopropylmethyl, cyclobutylmethyl, cyclopentylmethyl, cycloheptylmethyl, 2-cyclohexylmethyl, and the like.

When R represents phenyl, phenyl-lower-alkyl, benzhydryl, or phenyl-lower-alkenyl, the benzene ring of said radicals can be unsubstituted or can bear one or more substituents of low molecular weight and of such nature that they do not interfere with or take part in the reactions, to be described hereinafter, used in the preparation of the compounds. Moreover, the nucleus of the group, Het, in any of the compounds of Formula I can also be further substituted in either of the rings thereof by one or more of such substituents. Examples of such substituents include halogen (including fluorine, chlorine, bromine, and iodine), lower-alkyl, hydroxy, lower-alkoxy, methylenedioxy, ethylenedioxy, lower-alkylmercapto, lower-alkyl-sulfinyl, lower-alkylsulfonyl, nitro, lower-alkanoyl, sulfamyl, trifluoromethyl, and the like.

When R represents a phenyl-lower-alkyl radical, the lower-alkyl moiety of said radical can contain from one to four carbon atoms, and when R represents a phenyl-lower-alkenyl radical, the lower-alkenyl moiety of said radical can contain from three to four carbon atoms. Thus R represents, inter alia, phenyl, benzyl, phenetyl, 4-phenylbutyl, benzhydryl, or cinnamyl, or such radicals substituted in the benzene ring by one or more substituents of the nature described supra.

In the above general Formula I, the group Y represents lower-alkylene of from one to six carbon atoms, can be straight or branched, and when the group Y is attached to a nitrogen atom of the heterocyclic group, Het, is such that at least two carbon atoms separate the nitrogen atoms of the heterocyclic group and the piperazine ring. The lower-alkylene group, Y, thus stands, inter alia, for methylene, 1,2-ethylene, 1,3-propylene, 2-methyl-1,4-butylene, 1,6-hexylene, and the like.

The compounds of Formula I can also be substituted in the piperazine ring by one or more lower-alkyl radicals each containing from one to four carbon atoms.

The compounds of Formula I are prepared by reacting a 2-hydrazinopyridine with a 1-(4-substituted-piperazinyl)-lower-alkanoic acid. The reaction is preferably carried out in the absence of a solvent and at a temperture sufficiently high to ensure distillation of the water formed in the reaction, and for this purpose a temperature in the range from about 110° C. to about 350° C. is suitable. The reaction is illustrated by the following reaction sequence where R and Y have the meanings given above.

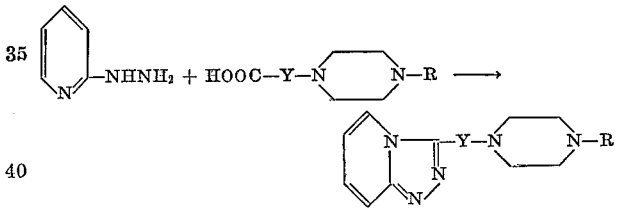

The 1-(4-substituted-piperazinyl)-lower-alkanoic acids required as starting materials are prepared by alkaline hydrolysis of the corresponding nitriles which in turn are prepared by reaction of a 1-substituted-piperazine with a halo-lower-alkyl-nitrile preferably in the presence of an acid-acceptor. The nitriles where Y is 1,2-ethylene are advantageously prepared by reacting a 1-substituted-piperazine with acrylonitrile.

The novel compounds of the instant invention are the bases of Formula I and the acid-addition and quaternary ammonium salts of said bases, and said acid-addition and quaternary ammonium salts are considered to be the full equivalents of the free bases. The compounds of the invention in free base form are converted to the acid-addition salt form by interaction of the base with an acid. In like manner, the free bases can be regenerated from the acid-addition salt form in the conventional manner, that is, by treating the salts with strong aqueous bases, for example alkali metal hydroxides, alkali metal carbonates and alkali metal bicarbonates. The bases thus regenerated can then be interacted with the same or a different acid to give back the same or a different acid-addition salt. Thus the novel bases and all of their acid-addition salts are readily interconvertible.

The quaternary ammonium salts are obtained by the addition of esters of strong acids to the free base form of the compounds, said esters having a molecular weight less than about 200. A preferred class of esters comprises alkyl, alkenyl, and monocarboxylic aryl-lower alkyl esters of strong inorganic acids or organic sulfonic acids, including such compounds as methyl chloride, methyl bromide, methyl iodide, ethyl bromide, propyl chloride, allyl chloride, allyl bromide, methyl sulfate, methyl benzenesulfonate, methyl p-toluenesulfonate, benzyl chloride, benzyl bromide, and substituted benzyl halides, such as p-chlorobenzyl chloride, p-nitrobenzyl chloride, p-methoxybenzyl chloride, o-chlorobenzyl chloride, and the like.

The quaternary ammonium salts are prepared by mixing the free base and ester of a strong acid in an inert solvent. Heating may be used to facilitate the reaction, although salt formation usually takes place readily at room temperature. The quaternary ammonium salt separates directly or can be obtained by concentration of the solution.

It is also possible to convert one quaternary ammonium salt to another in which the anion is different. If the anion of the original quaternary salt forms a water-insoluble silver salt the quaternary salt will react with silver oxide in aqueous medium to form the corresponding quaternary ammonium hydroxide, the original anion being removed as a precipitate. The quaternary ammonium hydroxide solution can then be neutralized with any desired acid weak or strong, to produce a new quaternary ammonium salt in which the anion is different from that of the original salt. In this way quaternary ammonium salts in which the anion is derived from a weak acid can be prepared.

It will thus be appreciated that Formula I not only represents the structural configuration of the bases of my invention but is also representative of the respective structural entity which is common to all of my respective compounds, whether in the form of the free bases or in the form of the acid-addition salts of the bases. I have found that by virtue of this common structural entity, the bases and their acid-addition salts have inherent pharmacodynamic activity of a type to be more fully decribed hereinbelow. This inherent pharmacodynamic activity can be enjoyed in useful form for pharmaceutical purposes by employing the free bases themselves or the acid-addition salts formed from pharmaceutically-acceptable acids, that is, acids whose anions are innocuous to the animal organism in effective doses of the salts so that beneficial properties inherent in the common structural entity represented by the free bases are not vitiated by side-effects ascribable to the anions.

In utilizing this pharmacodynamic activity of the salts of the invention, I prefer of course to use pharmaceutically-acceptable salts. Although water-insolubility, high toxicity, or lack of crystalline character may make particular salt species unsuitable or less desirable for use as such in a given pharmaceutical application, the water-insoluble or toxic salts can be converted to the corresponding pharmaceutically-aceptable bases by decomposition of the salt with aqueous base as described above, or alternatively they can be converted to any desired pharmaceutically-acceptable acid-addition salt by double decomposition reactions involving the anion, for example by ion-exchange procedures.

Moreover, apart from their usefulness in pharmaceutical applications, my salts are useful as characterizing or identifying derivatives of the free bases or in isolation or purification procedures. Like all of the acid-addition salts, such characterizing or purification salt derivatives can, if desired, be used to regenerate the pharmaceutically-acceptable free bases by reaction of the salts with aqueous base, or alternatively can be converted to a pharmaceutically-acceptable acid-addition salt by, for example, ion-exchange procedures.

It will be appreciated from the foregoing that all of the acid-addition and quaternary ammonium salts of my new bases are useful and valuable compounds, regardless of considerations of solubility, toxicity, physical form, and the like, and are accordingly within the purview of the instant invention.

The novel feature of the compounds of the invention, then, resides in the concept of the bases and cationic forms of the new 1-[(pyrido[2,1-c]-s-triazolyl)-loweralkyl]-4-substituted-piperazines and not in any particular acid or quaternary moiety or acid anion associated with the salt forms of my compounds; rather, the acid or quaternary moieties or anions which can be associated in the salt forms are in themselves neither novel nor critical and therefore can be any acid anion or acidlike substance capable of salt formation with bases. In fact in aqueous solutions, the base form of water-soluble acid-addition salt form of the compounds of the invention both possess a common protonated cation or ammonium ion.

Thus the acid-addition salts discussed above and claimed herein are prepared from any organic acid, inorganic acid (including organic acids having an inorganic group therein), or organo-metallic acid, organic mono- and polysulfonic and sulfonic acids, organic phosphonic and phosphinic acids, organic acids of arsenic and antimony, organic heterocyclic carboxylic, sulfonic, and sulfinic acids, acidic ion-exchange resins, and inorganic acids of any acid forming element or combination of elements. In addition, other salt-forming compounds which are acidic in their chemical properties but which are not generally considered as acids in the same sense as carboxylic or sulfonic acids are also considered to be among the numerous acids which can be used to prepare acid-addition salts of the compounds of the invention. There is also comprehended acidic phenolic compounds and acidic compounds having "activated" or acidic hydrogen atoms, as for example, picrolonic acid, or barbituric acid derivatives having an acidic proton. Also comprehended as salt forming agents are so-called Lewis acids which lack a pair of electrons in the outer "electron shell" and react with basic compounds having an unshared pair of electrons to form salts, for example boron trifluoride.

Thus appropriate acid-addition salts are those derived from such diverse acids as formic acid, acetic acid, isobutyric acid, alpha-mercaptopropionic acid, malic acid, fumaric acid, succinic acid, succinamic acid, tartaric acid, citric acid, lactic acid, benzoic acid, 4-methoxybenzoic acid, phthalic acid, anthranilic acid, 1-naphthalenecarboxylic acid, cinnamic acid, cyclohexanecarboxylic acid, mandelic acid, tropic acid, crotonic acid, acetylene dicarboxylic acid, sorbic acid, 2-furancarboxylic acid, cholic acid, pyrenecarboxylic acid, 2-pyridinecarboxylic acid, 3-indoleacetic acid, quinic acid, sulfamic acid, methane sulfonic acid, isethionic acid, benzenesulfonic acid, p-toluenesulfonic acid, p-aminophenylarsinic acid, phenylstibnic acid, phenylphosphinous acid, methylphosphonic acid, phenylphosphinic acid, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, phosphomolybdic acid, pyrophosphoric acid, arsenic acid, picric acid, picrolonic acid, barbituric acid, boron trifluoride, and the like.

The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution.

Pharmacological evaluation of the compounds of Formula I has demonstrated that they possess a variety of depressant actions on the autonomic nervous system, the cardiovascular system, and the skeletal muscular system. They depress psychomotor activity as evidenced by studies in mice in standard activity cages using the method of Dews, Brit. J. Pharmacol. 8, 46–48 (1953); they possess sedative activity as shown by the potentiation of sleeping time in mice induced by ether, thiopental sodium or hexobarbital sodium. They show skeletal muscle relaxant activity in mice in the inclined screen test.

When administered to rats, they show adrenolytic activity as evidenced by antagonism of the pressor effects of epinephrine; they lower the rectal temperature in mice; they possess anticonvulsant activity in mice as evidenced by their ability to protect mice from pentylenetetrazol-induced convulsions; they lower the blood pressure in rats according to the method of Kersten et al., J. Lab. Clin. Med. 32, 1090–1098 (1947); and they show cardiovascular activity in dogs as evidenced by the increase in heart force. These activities indicate their usefulness as tranquilizers, sedatives, skeletal muscle relaxants, adrenolytic agents, hypothermic agents, anti-convulsants, hypotensive agents and cardiovascular agents.

The compounds can be prepared for use by dissolving under sterile conditions a salt form of the compounds in water (or an equivalent amount of a non-toxic acid if the free base is used), or in a physiologically compatible aqueous medium such as saline, and stored in ampoules for intramuscular injection. Alternatively, they can be incorporated in unit dosage form as tablets or capsules for oral administration or in combination with suitable adjuvants such as calcium carbonate, starch, lactose, talc, magnesium stearate, gum acacia, and the like. Still further the compounds can be formulated for oral administration in aqueous alcohol, glycol, or oil solution or oil-water emulsions in the same manner as conventional medicinal substances are prepared.

The chemical structures of the compounds of the invention are established by their mode of synthesis and are corroborated by the correspondence between calculated values for the elements and values found by chemical analysis.

The following examples will further illustrate specific embodiments of the invention without the latter being limited thereto.

EXAMPLE 1

1-{2 - (3 - pyrido[2,1 - c]-s - triazolyl)ethyl}-4 - phenylpiperazine [I: Het is 3-pyrido[2,1-c]-s-triazolyl; Y is $CH_2CH_2$; R is $C_6H_5$]

A mixture of 3.5 g. (0.03 mole) of 2-hydrazinopyridine and 7.5 g. (0.032 mole) of β-(4-phenyl-1-piperazinyl)propionic acid was heated for ten minutes under nitrogen at 200° C. in a flask equipped with a magnetic stirrer and a nitrogen inlet tube. The temperature was then held at 340–350° C. for forty minutes. The mixture was cooled, dissolved in methanol, and chromatographed on a column of silica gel. The first 50 ml. of eluate was discarded, and the next 50 ml. was collected, acidified with a solution of 9 ml. of concentrated hydrochloric acid in 37 ml. of water. The solution was adjusted to pH 3.0–3.2 with dilute sodium hydroxide, cooled, and the resulting tan precipitate collected and dried. The latter was mixed with ethanol and dilute sodium hydroxide, and the mixture extracted with benzene. The benzene extracts, after drying, were evaporated giving a clear viscous gum which solidified. The latter was recrystallized from ethyl acetate giving 1.3 g. of 1-{2-(3-pyrido[2,1-c]-s-triazolyl)ethyl}-4-phenylpiperazine, M.P. 108.8–110.0° C. (corr.).

1-{2-(3-pyrido[2,1-c] - s - triazolyl)ethyl}-4 - phenylpiperazine can be reacted with hydriodic acid to form 1-{2-(3-pyrido[2,1-c]-s - triazolyl)ethyl}-4 - phenylpiperazine hydriodide, useful as a charcterizing intermediate.

1-{2-(3-pyrido[2,1 - c]-s - triazolyl)ethyl}-4 - phenylpiperazine, in the form of its hydriodide salt, can be converted to the hydrochloride salt by passing an aqueous solution of the former over an ion-exchange resin saturated with chloride ions.

1-{2-(3-pyrido[2,1-c] - s - triazolyl)ethyl}-4 - phenylpiperazine can be converted to its hydriodide salt and the latter recrystallized for purification purposes from an appropriate organic solvent. On suspension of the hydriodide in dilute aqueous sodium hydroxide, extraction of the suspension with chloroform, and removal of the chloroform from the extracts, 1-{2-(3-pyrido[2,1-c]-s-triazolyl)ethyl}-4-phenylpiperazine can be recovered in purified free base form.

EXAMPLES 2–24

By reacting an appropriate substituted-2-hydrazinopyridine with an appropriate β-(4-substituted-1-piperazinyl)-propionic acid according to the manipulative procedure described above in Example 1, there can be obtained the compounds of Formula I in Table 1 below, where, in each instance, Y is $CH_2CH_2$.

TABLE 1

| Example | Het substituent | R | Piperazine substituent |
|---|---|---|---|
| 2 | 4-$CH_3$ | $CH_3$ | |
| 3 | | $HOCH_2CH_2$ | |
| 4 | | 4-$ClC_6H_4$ | |
| 5 | | 3-$CH_3C_6H_4$ | 2-$CH_3$ |
| 6 | | 4-$HOC_6H_4$ | |
| 7 | 6-$CH_3$ | 2-$CH_3OC_6H_4$ | 6-$CH_3$ |
| 8 | | 3,4-$\overline{OCH_2O}C_6H_3$ | 3-$CH_3$ |
| 9 | | 3,4-$\overline{OCH_2CH_2O}C_6H_3$ | 6-$CH_3$ |
| 10 | | 4-$CH_3SC_6H_4$ | 2-n-$C_4H_9$ |
| 11 | | 4-$CH_3SOC_6H_4$ | 3-$CH(CH_3)_2$ |
| 12 | | 4-$CH_3SO_2C_6H_4$ | 2,2-di-$CH_3$ |
| 13 | | 4-$CF_3C_6H_4$ | 2,5-di-$CH_3$ |
| 14 | | 4-$NO_2C_6H_4$ | 2-$CH_3$ |
| 15 | | 3-$CH_3COC_6H_4$ | |
| 16 | | 4-$NH_2SO_2C_6H_4$ | |
| 17 | | 3,4,5-$(CH_3O)_3C_6H_2$ | |
| 18 | | 2-Cl-4-$CH_3C_6H_3$ | |
| 19 | | $C_6H_5CH_2$ | 2,6-di-$CH_3$ |
| 20 | | $C_6H_5CH{=}CHCH_2$ | 3,6-di-$CH_3$ |
| 21 | | $(C_6H_5)_2CH$ | 2,5-di-n-$C_3H_7$ |
| 22 | | 2-$C_5H_4N$ | |
| 23 | | $C_6H_{11}CH_2$ | |
| 24 | | $C_3H_5CH_2$ | |

EXAMPLE 25

1-{2-(3-pyrido[2,1-c]-s - triazolyl)ethyl}-2,6 - dimethylpiperazine [I: Het is 3-pyrido[2,1-c]-s-triazolyl; Y is $CH_2CH_2$; R is H]

By reducing the 1-{2-(3-pyrido[2,1-c]-s-triazolyl)-ethyl}-4-benzyl-2,6-dimethylpiperazine described above in Example 19 with hydrogen over a palladium-on-charcoal catalyst in an ethanol solvent, there is obtained 1-{2-(3-pyrido[2,1-c]-s-triazolyl)ethyl}-2,6 - dimethylpiperazine.

EXAMPLE 26–30

By following the manipulative procedure described above in Example 1, substituting for the β-(4-phenyl-1-piperazinyl)propionic acid used therein a molar equivalent amount of an appropriate (4-phenyl-1-piperazinyl)-lower-alkanoic acid (prepared by reaction, in the presence of sodium carbonate, of 1-phenylpiperazine with, respectively, α-chloroacetonitrile, γ-bromobutyronitrile, γ-bromo-β-methylbutyronitrile, δ-bromo-valeronitrile, and ω-oenanthylic nitrile, and hydrolyzing the resulting 1-cyanoalkyl-4-phenylpiperazines with dilute hydrochloric acid), there can be obtained the compounds of Formula I in Table 2 below where, in each instance, Het is 3-pyrido[2,1-c]-s-triazolyl, and R is phenyl.

TABLE 2

| Example: | Y |
|---|---|
| 26 | $CH_2$ |
| 27 | $(CH_2)_3$ |
| 28 | $CH_2CHCH_3CH_2$ |
| 29 | $(CH_2)_4$ |
| 30 | $(CH_2)_6$ |

I claim:
1. A compound of the formula

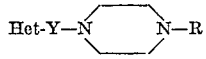

wherein Het is 3-pyrido[2,1-c]-s-triazolyl; R is hydrogen or lower-alkyl, hydroxy-lower-alkyl, phenyl, phenyl-lower-alkyl, benzhydryl, phenyl-loweralkenyl, cycloalkyl-lower-alkyl, or pyridyl; and Y is lower-alkylene of from one to six carbon atoms.

2. A compound according to claim 1 wherein R is phenyl.

3. 1-{2-(3-pyrido[2,1-c]-s-triazolyl)-ethyl}-4 - phenyl-piperazine according to claim 2 wherein Y is 1,2-ethylene.

References Cited

UNITED STATES PATENTS

| 3,004,978 | 10/1961 | Hunger et al. | 260—268 X |
| 3,247,202 | 4/1966 | Matter et al. | 260—268 X |
| 3,250,769 | 5/1966 | Schmidt et al. | 260—268 X |
| 3,318,880 | 5/1967 | Almirante et al. | 260—268 X |

DONALD G. DAUS, Primary Examiner

U.S. Cl. X.R.

260—240, 258, 296; 424—250

PO-1050
(5/69)

UNITED STATES PATENT OFFICE
CERTIFICATE OF CORRECTION

Patent No. 3,472,853　　　　　　Dated October 14, 1969

Inventor(s) Sydney Archer

It is certified that error appears in the above-identified patent and that said Letters Patent are hereby corrected as shown below:

Column 1, line 15, "triazoyl" should read --triazolyl--.
Column 2, line 8, "phenetyl" should read --phenethyl--.
Column 4, line 18, "sulfonic" should read -- -sulfinic --.

SIGNED AND SEALED
FEB 24 1970

(SEAL)
Attest:

Edward M. Fletcher, Jr.
Attesting Officer

WILLIAM E. SCHUYLER, JR.
Commissioner of Patents